United States Patent
La Croce

[15] 3,677,232
[45] July 18, 1972

[54] MILKING ASSISTANCE DEVICE

[72] Inventor: John Matthew La Croce, 40 Fulton Street, Middletown, N.Y. 10940

[22] Filed: Sept. 8, 1970

[21] Appl. No.: 70,358

[52] U.S. Cl. ............................................ 119/146, 119/14.12
[51] Int. Cl. ....................................................... A01k 29/00
[58] Field of Search ............... 119/146, 14.12, 109; 128/138, 128/98, 99

[56] References Cited

UNITED STATES PATENTS

| 928,080 | 7/1909 | Tatman | 119/146 |
| 198,282 | 12/1877 | Dowlin | 119/146 |
| 318,973 | 6/1885 | Fenton | 119/145 |

FOREIGN PATENTS OR APPLICATIONS

| 9,963 | 4/1895 | Switzerland | 119/143 |
| 19,094 | 10/1903 | Great Britain | 119/143 |

Primary Examiner—Aldrich F. Medbery
Attorney—Meyer A. Gross

[57] ABSTRACT

A milking assistance device which is strapped around a cow to raise its udder upwardly and forwardly to permit proper attachment to a suitable milk collection means. A first adjustable strap is disposed around the heart girth, a canvas sheet is positioned behind the udder and each end is secured to strap members which are adjustably and detachably secured to the first strap.

4 Claims, 2 Drawing Figures

INVENTOR
JOHN M. LACROCE

MILKING ASSISTANCE DEVICE

SUMMARY OF THE INVENTION

My invention is directed toward a device for positioning the udder of a cow that has just freshened for milking. It is sometimes very hard, when fresh cows with oversize udders are used, to properly position the milk collection apparatus thereunder. My device will gently raise and tip forward the udder to permit proper attachment of the apparatus. To this end, a first strap is disposed about heart girth of the cow. A second strap passes around the back of the udder. Third and fourth straps connect opposite ends of the third strap to the first strap in the spaced positions.

DETAILED DESCRIPTION OF PREFERRED EMBODIMENTS

Figure 1:
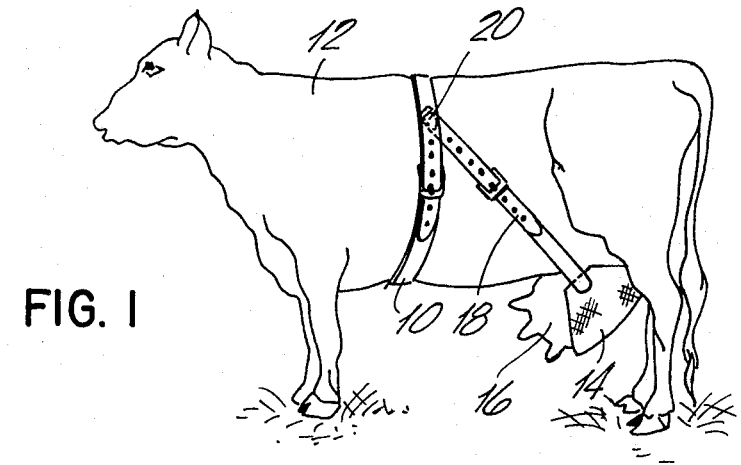
FIG. 1 is a side view of my invention in use.
Figure 2:
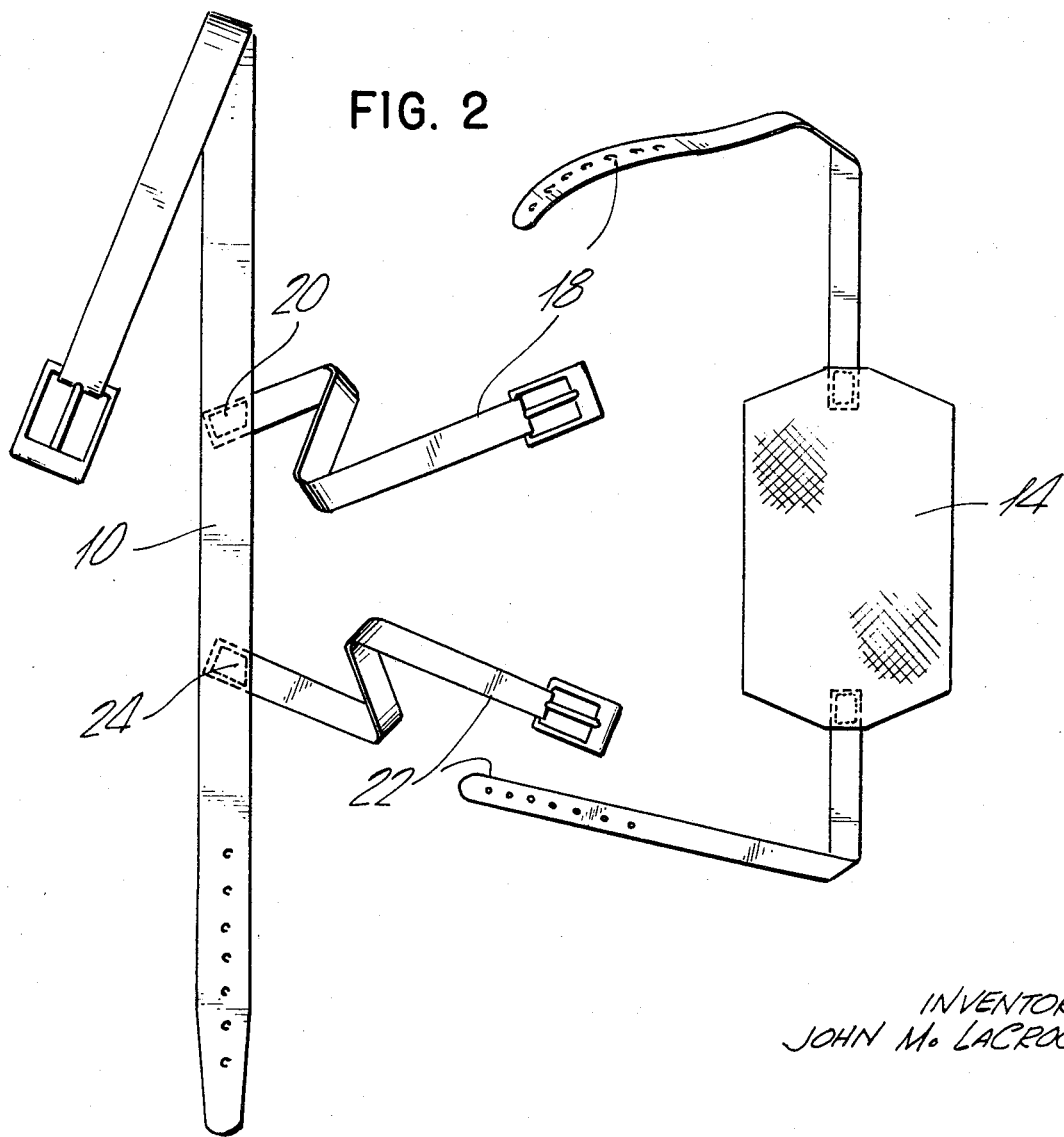
FIG. 2 is an exploded view of the parts of my invention.

Referring now to FIGS. 1-2, a first belt or strap 10 is disposed about the heart girth of cow 12. A canvas sheet 14 is wrapped or positioned behind the udder 16. One end of the sheet is connected by a first strap member 18 adjustable in length to one point 20 on strap 10 intermediate its ends. The opposite end of the sheet is connected by a second strap member 22 adjustable in length to a second point 24 spaced from the first point.

The device can then be used as previously described to position the udder forwardly and upwardly to facilitate the application of teat cups during the milking operation.

While I have described my invention with particular reference to the drawings, such is not to be considered as limiting its actual scope.

Having thus described this invention, what is asserted as new is:

1. A milking assistance device to improve the positioning of the udder of a cow for proper attachment to a suitable milk collection means, which comprises:
   a. a first body encirculing strap having oppositely disposed detachably securable ends;
   b. positioning means to lift the udder upwardly and forwardly, the means including:
      i. a rear udder portion support sheet disposed about the udder and having at least two ends;
      ii. first forwardly and upwardly directed securement means connected to one end of the sheet and to a first point on the strap between its ends;
      iii. second forwardly and upwardly directed securement means connected to the other end of the sheet and to another point on the strap between the first point and the oppositely disposed end of the strap from the first point;
      iv. the length of the securement means and the sheet raising the udder upwardly and forwardly upon attachment to the first strap member.

2. A device as set forth in claim 1 wherein each member is adjustable in length.

3. A device as set forth in claim 2 wherein the strap is adapted to be disposed about the heart girth of a cow.

4. A device as set forth in claim 3 wherein the strap is adapted to be disposed about the back of the udder of a cow.

* * * * *